United States Patent
Dalsgaard et al.

(10) Patent No.: US 11,310,738 B2
(45) Date of Patent: Apr. 19, 2022

(54) ENHANCED MACHINE TYPE COMMUNICATION RADIO RESOURCE MANAGEMENT REQUIREMENTS BASED ON MACHINE TYPE COMMUNICATION PHYSICAL DOWNLINK CONTROL CHANNEL MONITORING

(71) Applicant: NOKIA SOLUTIONS AND NETWORKS OY, Espoo (FI)

(72) Inventors: Lars Dalsgaard, Oulu (FI); Li Zhang, Beijing (CN); Ren Da, Warren, NJ (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 526 days.

(21) Appl. No.: 16/337,752

(22) PCT Filed: Sep. 30, 2016

(86) PCT No.: PCT/US2016/054653
§ 371 (c)(1),
(2) Date: Mar. 28, 2019

(87) PCT Pub. No.: WO2018/063282
PCT Pub. Date: Apr. 5, 2018

(65) Prior Publication Data
US 2021/0297952 A1  Sep. 23, 2021

(51) Int. Cl.
*H04W 52/02* (2009.01)
*H04W 4/70* (2018.01)
(Continued)

(52) U.S. Cl.
CPC ......... *H04W 52/0229* (2013.01); *H04W 4/70* (2018.02); *H04W 72/042* (2013.01); *H04W 72/0446* (2013.01); *H04W 76/28* (2018.02)

(58) Field of Classification Search
CPC ... H04W 52/0229; H04W 4/70; H04W 76/28; H04W 72/042; H04W 72/0446; H04W 52/0216; H04W 24/08; Y02D 30/70
See application file for complete search history.

(56) References Cited

U.S. PATENT DOCUMENTS

2013/0279353 A1   10/2013  Ji et al.
2013/0301499 A1   11/2013  Jain et al.
(Continued)

FOREIGN PATENT DOCUMENTS

CN   102958099 A   3/2013
CN   104429152 A   3/2015
(Continued)

OTHER PUBLICATIONS

International Search Report and Written Opinion dated Jan. 10, 2017 corresponding to International Patent Application No. PCT/US2016/054653.

(Continued)

*Primary Examiner* — Michael K Phillips
(74) *Attorney, Agent, or Firm* — Squire Patton Boggs (US) LLP

(57) ABSTRACT

Various communication systems may benefit from appropriate configuration of when a device is required to be active. For example, enhanced machine type communication radio resource management requirements regarding device activity can be aligned with machine type communication physical downlink control channel monitoring. A method can include determining a discontinuous reception usage state of a user equipment. The method can also include selecting a monitoring performance requirement from a plurality of monitoring performance requirements based on the determined discontinuous reception usage stage. The method can (Continued)

further include power saving in accordance with the selected monitoring performance requirement.

14 Claims, 5 Drawing Sheets

(51) Int. Cl.
*H04W 76/28* (2018.01)
*H04W 72/04* (2009.01)

(56) References Cited

U.S. PATENT DOCUMENTS

| | | |
|---|---|---|
| 2015/0029923 A1 | 1/2015 | Xu et al. |
| 2015/0119039 A1 | 4/2015 | Virtej et al. |
| 2015/0282208 A1 | 10/2015 | Yi et al. |
| 2016/0119970 A1* | 4/2016 | Lee ................... H04L 41/0813 370/328 |
| 2017/0094547 A1* | 3/2017 | Yum .................. H04W 56/001 |
| 2017/0118792 A1* | 4/2017 | Rico Alvarino .. H04W 52/0225 |
| 2017/0230780 A1* | 8/2017 | Chincholi ................ H04L 5/16 |
| 2017/0273072 A1* | 9/2017 | Wittberg ............ H04L 61/6022 |

FOREIGN PATENT DOCUMENTS

| | | | |
|---|---|---|---|
| CN | 104937980 A | 9/2015 | |
| CN | 105472535 A | 4/2016 | |
| CN | 105794287 A | 7/2016 | |
| EP | 2692073 B1 * | 10/2018 | ............ H04W 76/28 |
| WO | WO 2012/134219 A2 | 10/2012 | |
| WO | WO 2015/139779 A1 | 9/2015 | |

OTHER PUBLICATIONS

Extended European Search Report dated May 14, 2020 corresponding to European Patent Application No. 16917980.1.
Panasonic: "Discussion and WF for MPDCCH related Topic on eMTC," 3GPP Draft; R1-161244, 3GPP TSG RAN WG1 Meeting #84, St. Julian's, Malta, Feb. 24, 2016, XP051079178.
Panasonic: "Discussion on eMTC USS Starting Subframes and DRX Configuration," 3GPP Draft; R1-160808, 3GPP TSG RAN WG1 Meeting #84, St. Julian's, Malta, Feb. 14, 2016, XP051054135.
Communication pursuant to Article 94(3) EPC dated Apr. 9, 2021 corresponding to European Patent Application No. 16917980.1.
First Office Action dated May 19, 2021 corresponding to Chinese Patent Application No. 201680089738.7, and English Summary.
Nokia Networks et al., "Remaining issues for eMTC RLM," 3GPP R4-160515, 3GPP TSG-RAN WG4 Meeting #78, St. Julian's, Malta, Feb. 15-19, 2016.

* cited by examiner

When no DRX is in use the UE shall be able to identify and measure a new detectable FDD intra frequency cell according to requirements in Table 8.13.2.1.1.1-1 when SCH Ês/Iot >= -6 dB and when (G-1)*R ≤ MGRP

Table 8.13.2.1.1.1-1: Requirement on cell identification delay and measurement delay for FDD intrafrequency cell

| Gap pattern ID | Cell identification delay ($T_{identify\_intra\_UE\ cat\ M1}$) | Measurement delay ($T_{measure\_intra\_UE\ cat\ M1}$) |
|---|---|---|
| 0 | 1.44 seconds | 480 ms |
| 1 | 2.88 seconds | 960 ms |

When (G-1)*R>MGRP, the cell identification delay $T_{identify\_intra\_UE\ cat\ M1}$ is 36*G*R, and measurement delay is 12*G*R.

Figure 3

ENHANCED MACHINE TYPE COMMUNICATION RADIO RESOURCE MANAGEMENT REQUIREMENTS BASED ON MACHINE TYPE COMMUNICATION PHYSICAL DOWNLINK CONTROL CHANNEL MONITORING

CROSS-REFERENCE TO RELATED APPLICATION:

This application is a § 371 national stage application of and claims priority to International Patent Application No. PCT/US2016/054653, filed on Sep. 30, 2016, which is incorporated by reference herein in its entirety.

BACKGROUND

Field

Various communication systems may benefit from appropriate configuration of when a device is required to be active. For example, enhanced machine type communication radio resource management requirements regarding device activity can be aligned with machine type communication physical downlink control channel monitoring.

Description of the Related Art

In Rel-13 enhanced machine type communication (eMTC), the MTC physical downlink control channel (MPDCCH) search space is designed such that a user equipment (UE) may be configured to monitor MPDCCH in a discontinuous manner even when discontinuous reception (DRX) is not configured. This may enable power saving for eMTC UEs whose traffic is delay tolerant, and for whom battery life is more important than latency. With the MPDCCH design, UE is allowed to switch off its radio frequency (RF) chain in subframes where the UE is not required to monitor MPDCCH.

However, in Rel-13 the radio resource management (RRM)/radio link monitoring (RLM) requirements for eMTC are defined without considering that the UE may be configured to monitor MPDCCH in a discontinuous manner As a result, even if the UE is allowed to switch off the UE's own RF chain from MPDCCH monitoring point of view, it cannot do so because otherwise it will not be able to meet the RRM/RLM requirements.

In 3 GPP TS36.213, the MPDCCH search space is specified as follows. For MPDCCH UE-specific search space, Type 0 common search space, and Type 2 common search space locations of starting subframe k are given by $k=k_b$, where $k_b$ is the $b^{th}$ consecutive BL/CE DL subframe from subframe k0, and $b=u \cdot rj$, and $$u = 0, 1, \ldots \frac{r_{max}}{rj} - 1,$$

and $j \in \{1,2,3,4\}$, where subframe k0 is a subframe satisfying the condition $(10n_f + \lfloor n_s/2 \rfloor) \bmod T = 0$, where $T = r_{max} \cdot G$. For MPDCCH UE-specific search space, Type 0 common search space G is given by the higher layer parameter mPDCCH-startSF-UESS. For Type2-common search space, G is given by the higher layer parameter mPDCCH-startSF-CSS-RA-r13. Additionally, $r_{max}$ is given by higher layer parameter mPDCCH-NumRepetition, and r1, r2, r3, r4 are given in Table 9.1.5-3 of 3GPP TS36.213.

A BL/CE UE is not expected to be configured with values of $r_{max}$ and G that result in non-integer values of T. The expected UE behavior when DRX is not configured is illustrated in FIG. 1.

Thus, FIG. 1 illustrates MPDCCH monitoring when DRX is not configured. As shown in FIG. 1, UE will monitor MPDCCH in a period $T=r_{max}*G$ (G≥1), where $r_{max}$ is the configured maximum MPDCCH repetition level, G is the configured parameter for controlling MPDCCH monitoring period. Within each MPDCCH monitoring period T, the UE is required to monitor MPDCCH in a window of $r_{max}$ subframes.

When DRX is not configured, if G is configured as 1, UE will monitor MPDCCH continuously in all sub frames. When G is configured larger than 1, however, UE needs only to monitor MPDCCH in the window of $r_{max}$ subframes, and the UE may turn off its transceiver for power saving.

When DRX is configured, UE will turn on its transceiver only during DRX active time. It may turn off transceiver for power saving during the reset of time in a configured DRX cycle. Thus, when DRX is configure, UE is expected to monitor MPDCCH only during DRX Active time (defined without considering MPDCCH monitoring configurations) AND when UE is required to monitoring MPDCCH (FIG. 2). DRX offset, active time and DRX cycles are all configurable parameters.

FIG. 2 illustrates MPDCCH monitoring when DRX is configured. As can be seen, however, the periods do not align well with the MPDCCH monitoring periods.

Currently, the eMTC UE RRM/RLM requirements are defined in TS 36.133, covering the scenarios of without DRX and without DRX. These requirements, however, do not consider the impact of discontinuous monitoring of MPDCCH. As an example, the RRM requirements for coverage enhancement (CE) Mode A can be found, for example, at Table 8.13.2.1.1.1-1 and Table 8.13.2.1.1.2-1.

In the requirements, the UE is assumed to monitor MPDCCH continuously when DRX is not configured, and only during DRX OnDuration when DRX is configured. The MPDCCH monitoring window and period is not considered.

As a result, even if a UE is allowed to switch off the UE's own RF chain from MPDCCH monitoring point of view, the UE cannot do so because otherwise it will not be able to meet the RRM/RLM requirements.

SUMMARY

According to certain embodiments, a method can include determining a discontinuous reception usage state of a user equipment. The method can also include selecting a monitoring performance requirement from a plurality of monitoring performance requirements based on the determined discontinuous reception usage stage. The method can further include power saving in accordance with the selected monitoring performance requirement.

In certain embodiments, an apparatus can include means for determining a discontinuous reception usage state of a user equipment. The apparatus can also include means for selecting a monitoring performance requirement from a plurality of monitoring performance requirements based on the determined discontinuous reception usage stage. The apparatus can further include means for power saving in accordance with the selected monitoring performance requirement.

An apparatus, according to certain embodiments, can include at least one processor and at least one memory including computer program code. The at least one memory and the computer program code can be configured to, with the at least one processor, cause the apparatus at least to determine a discontinuous reception usage state of a user equipment. The at least one memory and the computer program code can also be configured to, with the at least one processor, cause the apparatus at least to select a monitoring performance requirement from a plurality of monitoring performance requirements based on the determined discontinuous reception usage stage. The at least one memory and the computer program code can further be configured to, with the at least one processor, cause the apparatus at least to power save in accordance with the selected monitoring performance requirement.

A computer program product can, according to certain embodiments, encode instructions for performing a process. The process can include determining a discontinuous reception usage state of a user equipment. The process can also include selecting a monitoring performance requirement from a plurality of monitoring performance requirements based on the determined discontinuous reception usage stage. The process can further include power saving in accordance with the selected monitoring performance requirement.

A non-transitory computer-readable medium can, in certain embodiments, be encoded with instructions that, when executed in hardware, perform a process. The process can include determining a discontinuous reception usage state of a user equipment. The process can also include selecting a monitoring performance requirement from a plurality of monitoring performance requirements based on the determined discontinuous reception usage stage. The process can further include power saving in accordance with the selected monitoring performance requirement.

BRIEF DESCRIPTION OF THE DRAWINGS:

For proper understanding of the invention, reference should be made to the accompanying drawings, wherein:

FIG. 3 illustrates RRM requirements for CE Mode A, in accordance with certain embodiments.

Figure 1:
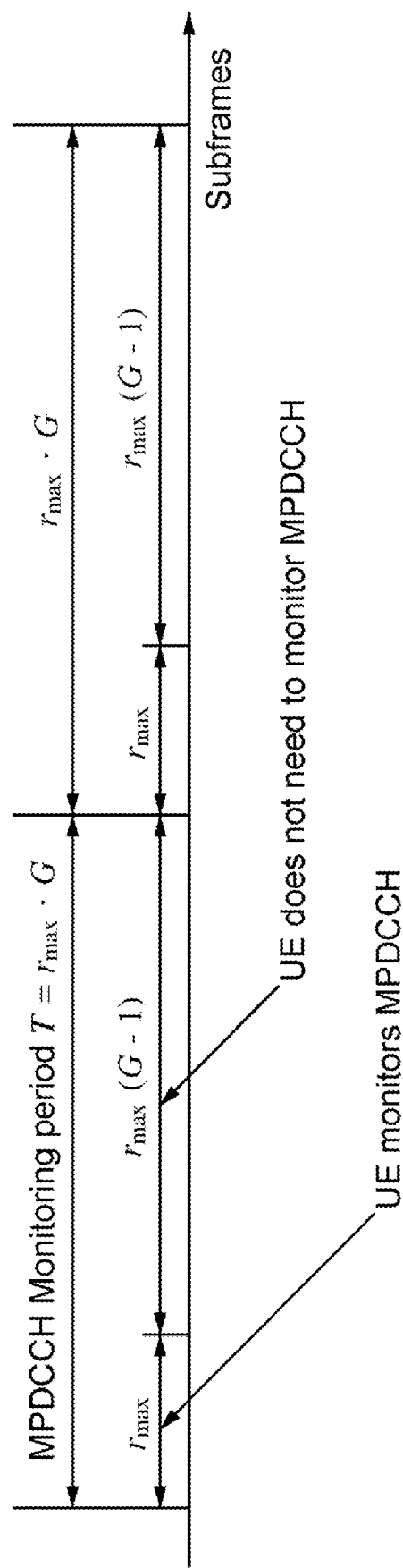
FIG. 1 illustrates MPDCCH monitoring when DRX is not configured.
Figure 2:
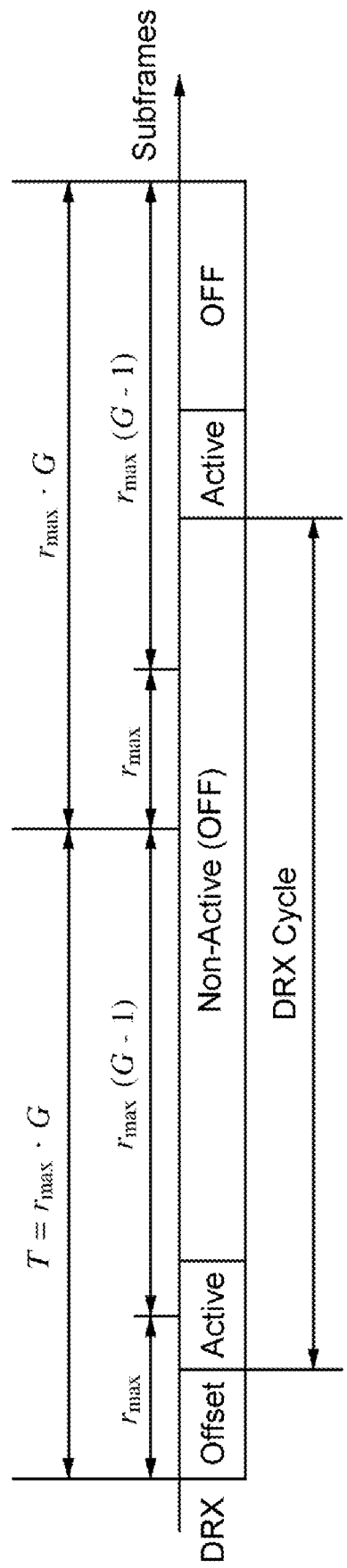
FIG. 2 illustrates MPDCCH monitoring when DRX is configured.

DETAILED DESCRIPTION:

A network may coordinate DRX and MPDCCH monitoring timing such that they are synchronized. The choice of DRX configuration and/or MPDCCH monitoring timing can be arranged such that the choice is not restricted on the network side. Likewise, the choice can be arranged to avoid restricting UE power saving due to RLM/RRM measurements.

In certain embodiments, a set of RRM/RLM requirements can enable UE power saving when the UE is configured to monitor MPDCCH in a discontinuous manner The RRM/RLM requirements according to certain embodiments can cover scenarios in which the UE is not configured with DRX and can also cover scenarios in which the UE is configured with DRX.

Certain embodiments address RRM/RLM measurement behavior and correspondingly a set of RRM/RLM requirements that take UE MPDCCH monitoring behavior into account. In the following, measurement gaps are discussed as some implementations may also use gap assistance for measurement although other implementation may not use gap assistance.

The following discussed embodiments include options for defining a set of RRM/RLM requirements for taking UE MPDCCH monitoring into account for the same UE RRM/RLM measurement behavior.

According to a first approach, a definition can represent the UE MPDCCH monitoring states for defining the RRM/RLM performance requirements for machine type communication user equipment or Cat-M1 UE as described in Release 13. The UE MPDCCH monitoring behavior can be defined by two states, namely, "no MPDCCH DRX is used" and "MPDCCH DRX is used."

The UE can be considered to be in the state of "no MPDCCH DRX is used" if MPDCCH G is configured as 1 or G is configured larger than 1, and some further condition is met.

In a first alternative, the further condition can be that the current subframe is within the first $r_{max}$ subframes in the MPDCCH monitoring time period $T=r_{max}*G$ (G≥1), where the UE is required to perform MPDCCH detection. In addition, the further condition can be that the current subframe is within any subframes after the first $r_{max}$ subframes in which the UE is required to conduct uplink transmission or downlink reception after successful MPDCCH detection in the first $r_{max}$ subframes in the monitoring time period as defined in TS 36.321 and TS 36.213.

In a second alternative, the condition can be whether the UE is required to conduct uplink transmission or downlink reception after successful MPDCCH detection in the first $r_{max}$ subframes in the monitoring time period as defined in TS 36.321 and TS 36.213.

Otherwise, in either of the first or second alternatives, the UE can be considered to be in the state "MPDCCH DRX is used." More particularly, with the first alternative, UE can be considered to be in the state of "no MPDCCH DRX is used" in the subframes of an MPDCCH monitoring window and in the state of "MPDCCH DRX is used" in the subframes outside the MPDCCH monitoring window if the UE is not required to conduct uplink transmission or downlink reception.

With the second alternative, the UE can be considered to be in the state of "MPDCCH DRX is used" in all subframes unless the UE is required to conduct uplink transmission or downlink reception. With the second alternative, the first approach can be largely the same as the second approach, discussed below.

The RRM/RLM requirements can be defined based on consideration of a UE's DRX states, for example whether the state is "DRX is used" or "DRX is not used." These states are defined in TS 36.133. The RRM/RLM requirements can also be defined based on consideration of the UE's MPDCCH DRX states, for example whether the state is "MPDCCH DRX is used" and "MPDCCH DRX is not used." The impact of a measurement gap can also be considered, if it is configured.

If a UE is in the states of "DRX is not used" and "MPDCCH DRX is not used," then the UE can follow non-DRX RRM/RLM performance requirements defined in TS 36.133 for both measurement gap configured or not configured cases.

If a UE is in the states of "DRX is not used" and "MPDCCH DRX is used," then the UE can follow the DRX RRM/RLM performance requirements defined in TS 36.133, with the DRX cycle in the existing requirements being replaced by MPDCCH monitoring time period for both measurement gap configured and not configured cases. For example, for the existing requirements defined based on the consideration both configured measurement gap and the DRX cycle, the requirements can be re-used by considering both configured measurement gap and the MPDCCH monitoring time period by simply replacing the DRX cycle with the MPDCCH monitoring time period without further changing the way that the measurement gap is considered in the existing requirements.

If a UE is in the states of "DRX is used" and "MPDCCH DRX is not used," then the UE can follow the existing DRX RRM/RLM performance requirements defined in TS 36.133 for both measurement gap configured or not configured cases. Moreover, if a UE is in the states of "DRX is used" and "MPDCCH DRX is used," then the UE can follow the existing DRX RRM/RLM performance requirements defined in TS 36.133, with the DRX cycle in the existing requirements being replaced by max{MPDCCH monitoring time period, DRX cycle} for both measurement gap configured or not configured cases. For example, for the existing requirements defined based on the consideration both configured measurement gap and the DRX cycle, the requirements can be re-used by considering DRX cycle, configured measurement gap and the MPDCCH monitoring time period with simply replacing the DRX cycle with the max{MPDCCH monitoring time period, DRX cycle} without changing the way that the measurement gap is considered in the existing requirements.

According to a second approach, a UE not in need of gaps can apply rules for shortest gap repetition period, for example, 40 ms. In this approach if G=1 or G*R≤MGRP (measurement gap repetition period, which may be, for example, 40 or 80 ms), existing RRM/RLM requirements can be reused. Otherwise, namely if G*R>MGRP, then following can take place. R can be a maximum reception level of machine type communication physical downlink control channel If UE is not in DRX state, and if UE is in monitoring state, that is the UE does not detect that the UE is scheduled by MPDCCH, then the UE can perform RRM/RLM measurement according to measurement gap configuration if configured, and according to MPDCCH monitoring configuration. The RRM/RLM requirements can be defined assuming UE performing RRM/RLM measurement at least once per max{MGRP, MPDCCH monitoring period}.

If UE is not in DRX state, and if UE is not in monitoring state, that is the UE detects it is scheduled by MPDCCH, then the UE can perform RRM/RLM measurement according to measurement gap configuration. Existing RRM/RLM requirements can be reused.

If UE is in DRX state, the UE can perform RRM/RLM measurement according to a measurement gap configuration if configured, as well as according to MPDCCH monitoring and DRX configuration. The RRM/RLM requirements can be defined assuming UE performing RRM/RLM measurement at least once per max{MGRP, MPDCCH monitoring period, DRX cycle}. The UE can always be in monitoring state if the UE is in DRX state. One condition for UE being in DRX state can be that the UE is not scheduled. In such a case the UE can be in MPDCCH monitoring state as defined in the second approach. If the UE is not in MPDCCH monitoring state because the UE is scheduled, then the UE will consequently not be in DRX state.

In addition, when (G−1)*R>MGRP and no PDSCH or PUSCH scheduling is detected during the MPDCCH monitoring window, the need for measurement gap can be avoided by requiring the UE to perform RRM/RLM measurement in the sleep time of a MPDCCH monitoring period.

The proposed UE RRM/RLM measurement behavior can be implemented by, for example, specifying related measurement requirements in 36.133 and configuring the UE and other devices in a network to operate in accordance with modified version of 36.133.

For example, FIG. 3 illustrates RRM requirements for CE Mode A, in accordance with certain embodiments. As shown in FIG. 3, when no DRX is in use the UE can be required to be able to identify and measure a new detectable frequency division duplex (FDD) intra frequency cell according to requirements in Table 8.13.2.1.1.1-1 when SCH Ês/Iot>=−6 dB and when (G−1)*R≤MGRP. When (G−1)*R>MGRP, the cell identification delay $T_{identify\_intra\_UE\ cat\ M1}$ can be 36*G*R, and measurement delay is 12*G*R. The specific values of cell identification delay and measurement delay for $T_{identify\_intra\_UE\ cat\ M1}$ are shown in Table 1 of FIG. 3 for both gap pattern 0 and gap pattern 1.

Figure 4:
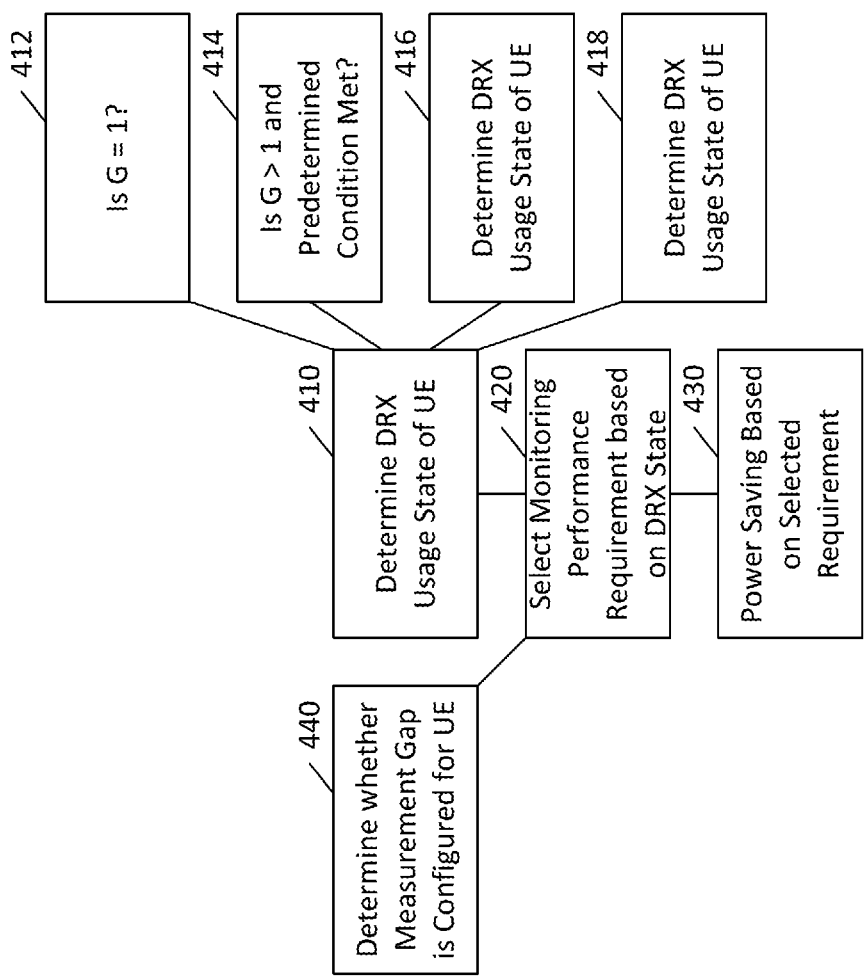
FIG. 4 illustrates a method according to certain embodiments.

FIG. 4 illustrates a method according to certain embodiments. The various steps shown in FIG. 4 may be performed by a device, such as a user equipment. As shown in FIG. 4, a method can include, at 410, determining a discontinuous reception usage state of a user equipment. The discontinuous reception usage state can refer to states such as "DRX is not used," "DRX is used," "MPDCCH DRX is not used," and "MPDCCH DRX is used." Thus, determining the discontinuous reception usage state of the user equipment can include determine which of these states the user equipment is currently in.

There can be four possibilities given consideration of the above-listed discontinuous reception usage states: DRX is not used and MPDCCH is not used; DRX is not used and MPDCCH is used; DRX is used and MPDCCH is not used; and DRX is used and MPDCCH is used.

The method can also include, at 420, selecting a monitoring performance requirement from a plurality of monitoring performance requirements based on the determined discontinuous reception usage stage. The monitoring performance requirements can be requirements for monitoring for radio resource management (RRM), radio link monitoring (RLM), or both. The specific requirements for each set can be preconfigured to the user equipment by a manufacturer, network, or other operator.

When it is determined that that the user equipment is in the general discontinuous reception state and is in the machine type communication physical downlink control channel discontinuous reception state, the selecting can include selecting a requirement for the user equipment to follow standard monitoring performance requirements modified to replace the discontinuous reception cycle with the greater of a discontinuous reception cycle time period and a machine type communication physical downlink control channel monitoring time period. These standard monitoring performance requirements can correspond to the requirements defined in 3GPP TS 36.133 (for example, v. 10.4.0). The DRX cycle in those standard requirements, however, can be replaced by max{MPDCCH monitoring time period, DRX cycle} for both measurement gap configured or not configured cases. For example, for the requirements defined based on the consideration both configured measurement gap and the DRX cycle, the requirements can be re-used by considering DRX cycle, configured measurement gap and the MPDCCH monitoring time period with simply replacing the DRX cycle with the max{MPDCCH monitoring time period, DRX cycle} without changing the way that the measurement gap is considered in the requirements.

More generally, when it is determined that that the user equipment is in the general discontinuous reception state and is in the machine type communication physical downlink control channel discontinuous reception state, the selecting can include selecting a requirement for the user equipment to follow defined assuming the user equipment performs radio measurement at least once per the greatest of a minimum measurement interval, a machine type communication physical downlink control channel monitoring time period, and a discontinuous reception cycle. The machine type communication physical downlink control channel monitoring time period can be G*R. G can be a configured parameter for controlling a machine type communication physical downlink control channel, and R can be a maximum reception level of machine type communication physical downlink control channel.

When it is determined that that the user equipment is in the general discontinuous reception state and is not in the machine type communication physical downlink control channel discontinuous reception state, the selecting can include selecting a requirement for the user equipment to follow standard monitoring performance requirements. These can be the unmodified requirements defined in 3GPP TS 36.133 (for example, v. 10.4.0).

More generally, when it is determined that that the user equipment is in the general discontinuous reception state and is not in the machine type communication physical downlink control channel discontinuous reception state, the selecting can include selecting a requirement for the user equipment to follow defined assuming the user equipment performs radio measurement at least once per the greater of a minimum measurement interval and a discontinuous reception cycle.

When it is determined that that the user equipment is not in the general discontinuous reception state and is in the machine type communication physical downlink control channel discontinuous reception state, the selecting can include selecting a requirement for the user equipment to follow standard monitoring performance requirements modified to replace the discontinuous reception cycle with a machine type communication physical downlink control channel monitoring time period. These standard monitoring performance requirements can correspond to the requirements defined in 3GPP TS 36.133 (for example, v. 10.4.0). The DRX cycle in those standard requirements, however, can be replaced by MPDCCH monitoring time period for both measurement gap configured and not configured cases. For example, for the requirements defined based on the consideration both configured measurement gap and the DRX cycle, the requirements can be re-used by considering DRX cycle, configured measurement gap and the MPDCCH monitoring time period with simply replacing the DRX cycle with the MPDCCH monitoring time period without changing the way that the measurement gap is considered in the requirements.

More generally, when it is determined that that the user equipment is not in the general discontinuous reception state and is in the machine type communication physical downlink control channel discontinuous reception state, the selecting can include selecting a requirement for the user equipment to follow defined assuming the user equipment performs radio measurement at least once per the greater of a minimum measurement interval and a machine type communication physical downlink control channel monitoring time period. As in the previous example, the machine type communication physical downlink control channel monitoring time period can be G*R. G can be a configured parameter for controlling a machine type communication physical downlink control channel R can be a maximum reception level of machine type communication physical downlink control channel When it is determined that that the user equipment is not in the general discontinuous reception state and is not in the machine type communication physical downlink control channel discontinuous reception state, the selecting can include selecting a requirement for the user equipment to follow standard monitoring performance requirements. These can be the unmodified requirements defined in 3GPP TS 36.133 (for example, v. 10.4.0).

More generally, when it is determined that that the user equipment is not in the general discontinuous reception state and is not in the machine type communication physical downlink control channel discontinuous reception state, the selecting can include selecting a requirement for the user equipment to follow defined assuming the user equipment performs radio measurement at least once per a minimum measurement interval.

The method can further include, at 430, power saving in accordance with the selected monitoring performance requirement. The power saving can involve, for example, at an appropriate time switching off an RF chain, or otherwise operating in a lower power mode. The power saving can also involve, at another appropriate time switching the RF chain back on, or otherwise operating at a higher power mode. Generally, the power saving can include using a power saving technique or disabling the power saving technique.

The method can also include, at 440, determining whether a measurement gap is configured for the user equipment. The selecting at 420 can be further based on the determination of measurement gap configuration of the user equipment.

The discontinuous reception state can refer broadly to any discontinuous reception state, which can be considered a general discontinuous reception state or more specifically can refer to a machine type communication physical downlink control channel discontinuous reception state. Both a general and a machine type communication physical downlink control channel discontinuous reception state can be taken into account in the state determination. General discontinuous reception can include the states defined in TS 36.133 and discussed above.

The method can include, at 412, determining that the user equipment is not in the machine type communication physical downlink control channel discontinuous reception state when G is equal to 1, wherein G is a configured parameter for controlling a machine type communication physical downlink control channel The method can additionally include, at 414, determining that the user equipment is not in the machine type communication physical downlink control channel discontinuous reception state when G is greater than 1, and a further predetermined condition is met.

The further predetermined condition can include whether a subframe is within a configured maximum machine type communication physical downlink control channel repetition level of the user equipment, or within that maximum plus any scheduled subframes. Alternatively, the further predetermined condition can include whether the user equipment is required to conduct an uplink transmission or downlink reception.

The method can also include, at 416, determining that the user equipment is in the machine type communication physical downlink control channel discontinuous reception state in a subframe outside a maximum machine type communication physical downlink control channel monitoring window; and determining that the user equipment is not in the machine type communication physical downlink control channel discontinuous reception state in a subframe within a maximum machine type communication physical downlink control channel monitoring window.

Figure 5:
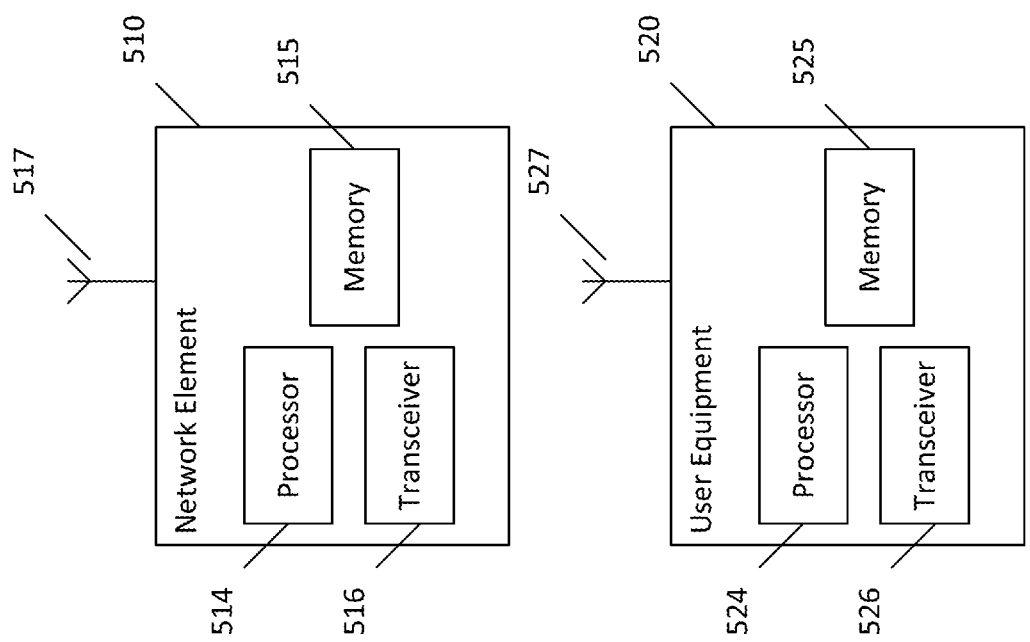
FIG. 5 illustrates a system according to certain embodiments.

Similarly, the method can further include, at 418, determining that the user equipment is not in the machine type communication physical downlink control channel discontinuous reception state when the user equipment detects that the user equipment is scheduled by machine type communication physical downlink control channel; and determining that the user equipment is in the machine type communication physical downlink control channel discontinuous reception state when the user equipment detects that the user equipment is not scheduled by machine type communication physical downlink control channel The selecting a monitoring performance requirement can be further contingent on whether G*R is greater than a configured measurement gap repetition period, wherein G is a configured parameter for controlling a machine type communication physical downlink control channel, and R is a maximum reception level of machine type communication physical downlink control channel FIG. 5 illustrates a system according to certain embodiments of the invention. It should be understood that each block of the flowchart of FIG. 4 may be implemented by various means or their combinations, such as hardware, software, firmware, one or more processors and/or circuitry. In one embodiment, a system may include several devices, such as, for example, network element 510 and user equipment (UE) or user device 520. The system may include more than one UE 520 and more than one network element 510, although only one of each is shown for the purposes of illustration. A network element can be an access point, a base station, an eNode B (eNB), or any other network element. Each of these devices may include at least one processor or control unit or module, respectively indicated as 514 and 524. At least one memory may be provided in each device, and indicated as 515 and 525, respectively. The memory may include computer program instructions or computer code contained therein, for example for carrying out the embodiments described above. One or more transceiver 516 and 526 may be provided, and each device may also include an antenna, respectively illustrated as 517 and 527. Although only one antenna each is shown, many antennas and multiple antenna elements may be provided to each of the devices. Other configurations of these devices, for example, may be provided. For example, network element 510 and UE 520 may be additionally configured for wired communication, in addition to wireless communication, and in such a case antennas 517 and 527 may illustrate any form of communication hardware, without being limited to merely an antenna.

Transceivers 516 and 526 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 520 may be a mobile station (MS) such as a mobile phone or smart phone or multimedia device, a computer, such as a tablet, provided with wireless communication capabilities, personal data or digital assistant (PDA) provided with wireless communication capabilities, portable media player, vehicle, digital camera, pocket video camera, navigation unit provided with wireless communication capabilities or any combinations thereof. The user device or user equipment 520 may be a sensor or smart meter, or other device that may usually be configured for a single location.

In an exemplifying embodiment, an apparatus, such as a node or user device, may include means for carrying out embodiments described above in relation to FIG. 4.

Processors 514 and 524 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or units of at least one chip set (e.g., procedures, functions, and so on). Memories 515 and 525 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 510 and/or UE 520, to perform any of the processes described above (see, for example, FIG. 4). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 5 illustrates a system including a network element 510 and a UE 520, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Certain embodiments may have various benefits and/or advantages. For example, in certain embodiments the UE measurement behavior can be aligned with MPDCCH monitoring behavior. Moreover, power saving can be enabled in the time period when UE is not required to monitor MPDCCH.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   determining a discontinuous reception usage state of a user equipment, wherein the discontinuous reception usage state comprises a general discontinuous reception state, a machine type communication physical downlink control channel discontinuous reception state, or both a general discontinuous reception state and a machine type communication physical downlink control channel discontinuous reception state;
   selecting a monitoring performance requirement from a plurality of monitoring performance requirements based on the determined discontinuous reception usage state, wherein when it is determined that the user equipment is in the general discontinuous reception state and is in the machine type communication physical downlink control channel discontinuous reception state, the selecting comprises selecting a requirement for the user equipment to follow standard monitoring performance requirements modified to replace the discontinuous reception cycle with the greater of a discontinuous reception cycle time period and a machine type communication physical downlink control channel monitoring time period, wherein the machine type communication physical downlink control channel monitoring time period is G*R, wherein G is a configured parameter for controlling a machine type communication physical downlink control channel, and R is a maximum reception level of machine type communication physical downlink control channel; and
   power saving in accordance with the selected monitoring performance requirement.

2. The method of claim 1, wherein the monitoring performance requirements comprise requirements for monitoring for radio resource management or radio link monitoring.

3. The method of claim 1, wherein when it is determined that the user equipment is in the general discontinuous reception state and is not in the machine type communication physical downlink control channel discontinuous reception state, the selecting comprises selecting a requirement for the user equipment to follow standard monitoring performance requirements.

4. The method of claim 1, wherein when it is determined that that the user equipment is not in the general discontinuous reception state and is in the machine type communication physical downlink control channel discontinuous reception state, the selecting comprises selecting a requirement for the user equipment to follow standard monitoring performance requirements modified to replace the discontinuous reception cycle with a machine type communication physical downlink control channel monitoring time period, wherein the machine type communication physical downlink control channel monitoring time period is G*R, wherein G is a configured parameter for controlling a machine type communication physical downlink control channel, and R is a maximum reception level of machine type communication physical downlink control channel.

5. The method of claim 1, further comprising:
   determining that the user equipment is not in the machine type communication physical downlink control channel discontinuous reception state when G is equal to 1, wherein G is a configured parameter for controlling a machine type communication physical downlink control channel.

6. The method of claim 1, further comprising:
   determining that the user equipment is not in the machine type communication physical downlink control channel discontinuous reception state when G is greater than 1, and a further predetermined condition is met, wherein G is a configured parameter for controlling a machine type communication physical downlink control channel.

7. The method of claim 6, wherein the further predetermined condition comprises whether a subframe is within a configured window for monitoring machine type communication physical downlink control channel, wherein the length of the window is same as maximum repetition level of the user equipment.

8. The method of claim 6, wherein the further predetermined condition comprises whether a subframe is after a configured window for monitoring machine type communication physical downlink control channel and the user equipment is scheduled in the subframe.

9. The method of claim 6, wherein the further predetermined condition comprises that the user equipment is required to conduct an uplink transmission or downlink reception.

10. The method of claim 1, further comprising:
    determining that the user equipment is in the machine type communication physical downlink control channel discontinuous reception state if a subframe is outside a maximum machine type communication physical downlink control channel monitoring window and the user equipment is not scheduled in the subframe.

11. The method of claim 1, further comprising:
    determining that the user equipment is in the machine type communication physical downlink control channel discontinuous reception state when the user equipment detects that the user equipment is not scheduled by machine type communication physical downlink control channel.

12. The method of claim 1, wherein the selecting a monitoring performance requirement is further contingent on whether G*R is greater than a configured measurement gap repetition period, wherein G is a configured parameter for controlling a machine type communication physical downlink control channel, and R is a maximum reception level of machine type communication physical downlink control channel.

13. An apparatus comprising:
    at least one processor and at least one memory including a computer program code, the at least one memory and the computer program code configured to, with the at least one processor, cause the apparatus at least to:
    determine a discontinuous reception usage state of a user equipment, wherein the discontinuous reception usage state comprises a general discontinuous reception state, a machine type communication physical downlink control channel discontinuous reception state, or both a general discontinuous reception state and a machine type communication physical downlink control channel discontinuous reception state;
    select a monitoring performance requirement from a plurality of monitoring performance requirements based on the determined discontinuous reception usage state, wherein when it is determined that the user equipment is in the general discontinuous reception state and is in the machine type communication physical downlink control channel discontinuous reception state, the selecting comprises selecting a requirement for the user equipment to follow standard monitoring performance requirements modified to replace the discontinuous reception cycle with the greater of a discontinuous reception cycle time period and a machine type communication physical downlink control channel monitoring time period, wherein the machine type communication physical downlink control channel monitoring time period is G*R, wherein G is a configured parameter for controlling a machine type communication physical downlink control channel, and R is a maximum reception level of machine type communication physical downlink control channel; and
    power save in accordance with the selected monitoring performance requirement.

14. A computer program embodied on a non-transitory computer readable medium, said computer program comprising a set of instructions, execution of which by a processor configures an apparatus to at least:
    determine a discontinuous reception usage state of a user equipment, wherein the discontinuous reception usage state comprises a general discontinuous reception state, a machine type communication physical downlink control channel discontinuous reception state, or both a general discontinuous reception state and a machine type communication physical downlink control channel discontinuous reception state;
    select a monitoring performance requirement from a plurality of monitoring performance requirements based on the determined discontinuous reception usage state, wherein when it is determined that the user equipment is in the general discontinuous reception state and is in the machine type communication physical downlink control channel discontinuous reception state, the selecting comprises selecting a requirement for the user equipment to follow standard monitoring performance requirements modified to replace the discontinuous reception cycle with the greater of a discontinuous reception cycle time period and a machine type communication physical downlink control channel monitoring time period, wherein the machine type communication physical downlink control channel monitoring time period is G*R, wherein G is a configured parameter for controlling a machine type communication physical downlink control channel, and R is a maximum reception level of machine type communication physical downlink control channel; and
    power save in accordance with the selected monitoring performance requirement.

* * * * *